March 12, 1940.  C. L. HAINES  2,193,360
AUTOMOTIVE BRAKE EQUALIZER
Filed May 5, 1938   2 Sheets-Sheet 1
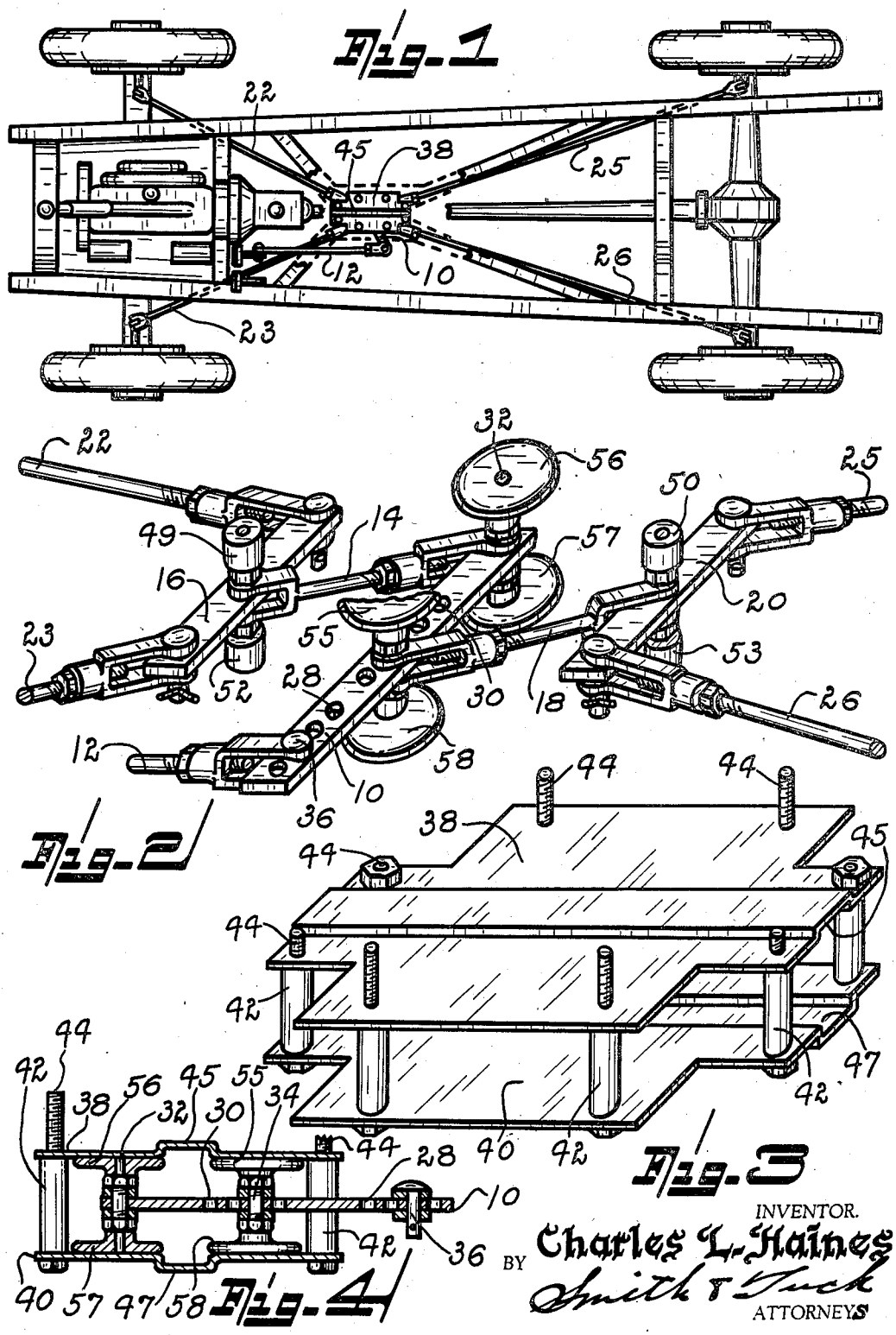
INVENTOR.
Charles L. Haines
BY Smith & Tuck
ATTORNEYS March 12, 1940. C. L. HAINES 2,193,360
AUTOMOTIVE BRAKE EQUALIZER
Filed May 5, 1938  2 Sheets-Sheet 2
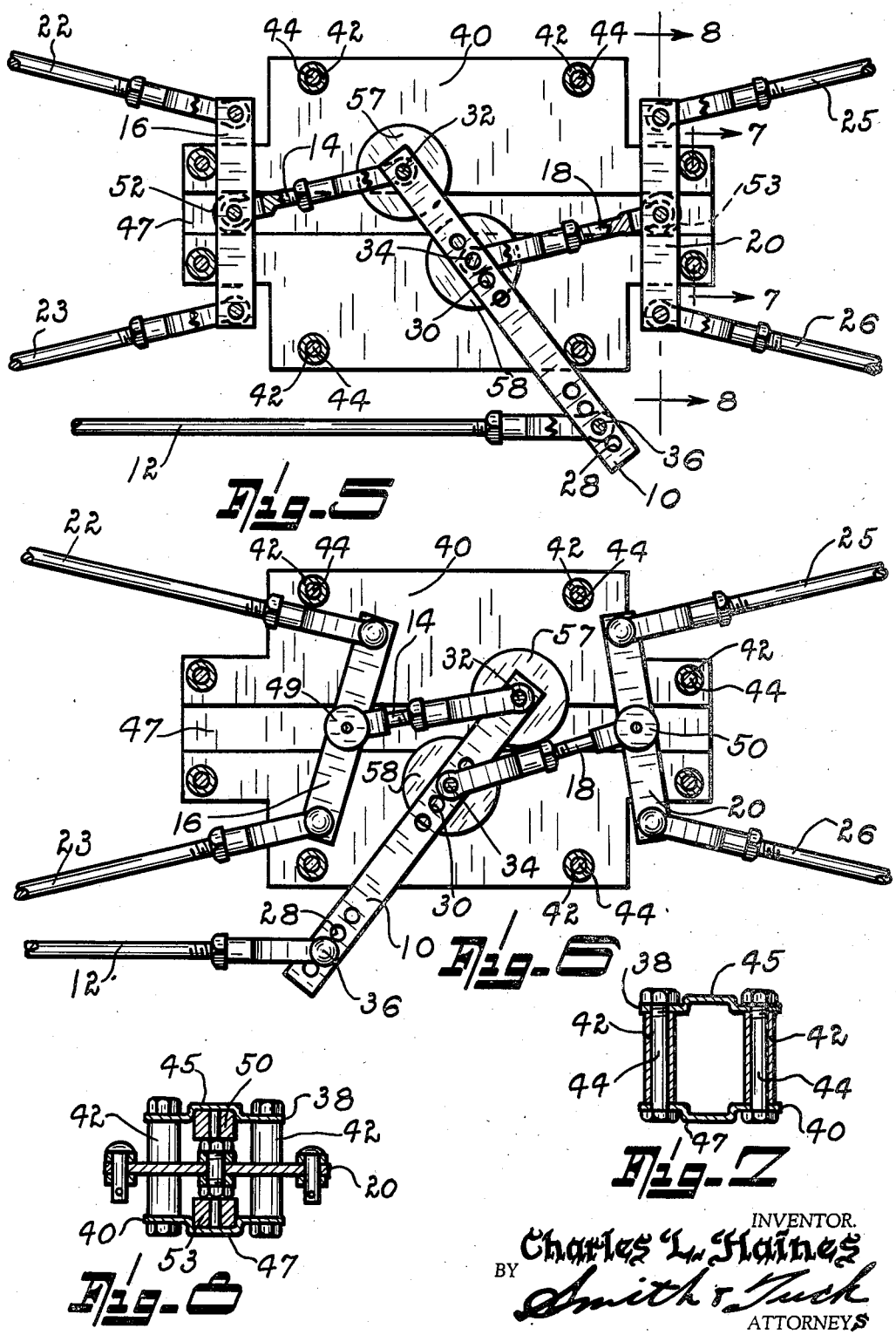
INVENTOR.
Charles L. Haines
BY Smith & Tuck
ATTORNEYS Patented Mar. 12, 1940

2,193,360

UNITED STATES PATENT OFFICE 2,193,360

AUTOMOTIVE BRAKE EQUALIZER

Charles L. Haines, Seattle, Wash., assignor of thirty per cent to L. Oriville Cameron, Seattle, Wash.

Application May 5, 1938, Serial No. 206,264

10 Claims. (Cl. 188—204)

My present device relates to means for distributing an applied force to several points of application and which, because of its construction, is particularly adaptable as an automotive brake equalizer.

In automobile use, it is especially desirable to have a distribution of the braking effort, as applied by the service brake, so that it may be distributed as desired on the braking wheels. Commonly it is found desirable to have equal braking effort on each pair of wheels and usually this braking effort is desirable in accordance with the weight distribution of the vehicle. In many instances where the bulk, more than half, of the weight, is placed on the front wheels it is often desirable that more than half the braking effort be applied to those wheels. In other instances it may be the rear wheels that carry the most of the load and in vehicles employing four rear wheels naturally a very appreciable portion of the braking effort should be applied to the rear wheels.

With my present arrangement I have, therefore, provided means which will assure that as long as pairs of wheels are reasonably in adjustment each equal braking strain will be applied to each pair of wheels.

Then I further provide means which assure that once the desirable ratio has been ascertained, any definite ratio of division of the braking effort can be consistently applied to those wheels. If it is desirable for instance to have sixty per cent of the braking force applied to the rear wheels and forty per cent applied to the front wheels my device will readily take care of such a division; or, by proper design, will make it possible to vary this ratio either way from fifty per cent.

In addition to these objects I have provided a means that may be very cheaply constructed, that will be durable and foolproof, and which, because of the simplicity of construction can be relied upon to give long periods of trouble-free service.

Other and more specific objects will be apparent from the following description taken in connection with the accompanying drawings, wherein Figure 1 is a top plan view of an automobile chassis showing a desirable location for my equalizing means.

Figure 2 is a perspective view showing the moving parts of my device removed from their housing to better illustrate their construction and relationship to each other.

Figure 3 is a perspective of a housing suitable for use with my device.

Figure 4 is a typical, cross-sectional view taken transversely of my housing and along the longitudinal axis of the primary lever.

Figure 5 is a top plan view of my device with the top cover removed and certain parts shown in section, illustrating my device in the position it normally assumes when all braking pressure is released.

Figure 6 is a plan view similar to Figure 5 but showing my device in its operating position with full braking pressure applied; in the drawing the angularity of the secondary levers has been somewhat exaggerated to more clearly illustrate the range of adaptability of my equalizing device.

Figure 7 is a cross-sectional view in elevation taken along the line 7—7 of Figure 5.

Figure 8 is a cross-sectional view in elevation taken along the line 8—8 of Figure 5.

Referring to the drawings, throughout which like reference characters indicate like parts, 10 designates the primary lever of my device. This has, secured at or near one of its ends, a brake rod 12 which is secured to the brake applying means as the brake pedal, lever, or cylinder.

Pivotally secured at the opposite end of lever 10 is, as shown in the present drawing, the connecting rod 14 which provides a coupling between the primary lever 10 and the front secondary lever link 16. At a point intermediate the two ends of lever 10 is pivotally secured a second connecting rod 18 which is in turn pivotally secured to the rear secondary lever or link 20. These secondary links each have at a point normally equidistant from its center, pivotally secured brake rods as 22, 23 fastened to the front secondary link 16; and, to the rear link 20 similarly at equidistance from the connecting rod pivot are connected the rear brake rods 25 and 26. The exact means employed for coupling the brake rod to the secondary levers or links, or to couple the secondary levers or links to the primary lever, is a matter of individual design and preference. Throughout the present drawings for clearness I have illustrated the conventional brake rod yoke, or shackle.

It will be noted that the present drawings illustrate a plurality of holes as 28 at one end of lever 10 and a second plurality of holes as 30 at the intermediate point in lever 10. These holes are merely illustrative of a means for changing the point of attachment of connecting rod 18 and the brake rod 12 so that various lever arms can be provided and the distance from pivot 32 to pivot 34 may be varied with respect to the distance from pivot 34 to pivot 36. In the present illustrations I have shown the distance from points 32 to 34 as less than the distance from points 34 to 36. With such an arrangement more of the force applied to rod 12 will be applied to connecting rod 18 than to connecting rod 14 so that greater strain will be placed upon the brake rods 25 and 26 than on rods 22 and 23. If on the other hand this relationship were changed the braking strains would be proportionately modified and may be even arranged so that greater braking effort is applied to the forward secondary lever 16 than to the rear secondary lever 20.

In order that my equalizer may be held fixedly in position and follow out my principles with certainty, I prefer to provide an enclosing housing which for a matter of convenience I provide as having a cover plate 38 and a lower plate 40 spaced apart as by bushing 42 which encircles bolts or studs 44. Each of plates 38 and 40 have a longitudinally formed guide channel as 45 and 47, respectively. These channels are adapted to engage and guide rollers 49 and 50 and rollers 52 and 53, respectively. These rollers as will probably be best noted from Figures 2 and 8 are mounted for rotation upon extension of the bolt which forms the pivot for connecting rods 14 and 18 engaging the secondary levers 16 and 20, respectively.

Mounted similarly to rollers 50 to 53 inclusive, are mushroom slippers 55, 56, 57, and 58 which are mounted upon the bolt forming the pivot for connecting rod 14 and 18 where they engage lever 10. Each of these mushroom slippers are provided of sufficient diameter and with rounded corners so that while they support and position pivots 32 and 34 they will slide freely over channels 45 and 47 without danger of their becoming engaged therein.

In the drawings accompanying this specification I have illustrated the simplest form of my brake equalizer such as would be used to distribute a single applied braking effort to four wheels. It will be apparent it is believed that it might be given continual application where it is desired to divide a tension loading between different points of application and, because of its construction, will permit this load to be applied to pairs of points of application in varying ratio in accordance with the initial adjustment of the device. It further is believed to be apparent that while I have illustrated and designated the various views in a manner that would indicate a horizontal disposition of these parts that the same principles of operation would be in free play whether the device were standing on end or whether it were used with its longitudinal axis in a vertical plane.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

Having thus fully described my invention, what I claim as new and desire to secure by Letters Patent is:

1. In a brake equalizer the combination with an operating rod, pairs of brake rods, and links pivotally connecting the rods of each of said pairs, of a floating lever intermediate said links, connecting rods pivotally connecting said lever and said links, means permitting the adjustment of the leverage of said connecting rods, and means for guiding the movement of said links.

2. In a brake equalizer the combination with an operating rod, pairs of brake rods, and links pivotally connecting the rods of each of said pairs, of a floating lever intermediate said links, connecting rods pivotally connecting said lever and links, and means including a housing comprising spaced, grooved plates for guiding the movement of said links.

3. In a brake equalizer the combination with an operating lever, pairs of brake rods, and links pivotally connecting the rods of each of said pairs, of a floating lever intermediate said links and gliding supports for said floating lever, connecting rods pivotally connecting said floating lever and said links, and means for guiding the movement of said links.

4. In a brake equalizer the combination with an operating rod, pairs of brake rods, and links pivotally connecting the rods of each of said pairs, of a floating lever intermediate said links and gliding supports for said lever, connecting rods pivotally connecting said lever and said links, and means including a housing comprising spaced grooved plates for guiding the movement of said links, and confining said gliding supports.

5. In a brake equalizer the combination with an operating rod, pairs of brake rods, and links pivotally connecting the rods of each of said pairs, of a floating lever intermediate said links and gliding supports for said lever, connecting rods pivotally connecting said lever and said links, means permitting the adjustment of the leverage of said connecting rods, and means including a housing comprising spaced grooved plates for guiding the movement of said links and for confining said gliding supports.

6. In a brake equalizer the combination with an operating rod, pairs of brake rods, and links pivotally connecting the rods of each of said pairs, of a floating lever intermediate said links and circular gliding supports for said lever, connecting rods pivotally connecting said lever and said links, means permitting the adjustment of the leverage of said connecting rods, means for guiding the movement of said links including a housing comprising spaced grooved plates, and said grooves being of lesser width than the diameter of said circular gliding supports.

7. In a brake equalizer, the combination with a housing having upper and lower walls and longitudinally extending guide grooves in said walls, two pairs of brake rods, and links each pivotally connecting the ends of each pair of rods, of a floating-lever intermediate said links and an operating rod pivotally connected to one end of said lever, a connecting rod pivotally connecting the other end of the lever to one of said links, a second connecting rod pivotally connected to the other of said links and also pivotally connected to the floating lever, and guide members mounted on the links and movable in said grooves.

8. In a brake equalizer, the combination with two pairs of brake rods, a link pivotally connecting the ends of each pair of brake rods, and a floating lever mounted intermediate the links, of means for supporting the floating lever and an operating rod pivotally connected to the floating lever, connecting rods pivotally joining said lever with the said links, and means for guiding said links as they move in opposite directions along a straight line.

9. In a brake equalizer, the combination with an operating rod, pairs of brake rods, and links pivotally connecting the rods of each of said pairs, of a floating lever intermediate said links, connecting rods pivotally connecting said lever and links, a housing having spaced upper and lower walls and guiding grooves in the adjoining faces of said walls, and upper and lower guide rollers mounted at the pivotal joints between said links and said connecting rods and adapted to travel in said grooves.

10. In a brake equalizer, the combination with an operating rod, pairs of brake rods, and links pivotally connecting the rods of each said pairs, of a floating lever intermediate said links, means for supporting said lever, said lever being pivotally connected at one end to the operating rod, a connecting rod pivotally connecting the other end of the lever to one link, a connecting rod pivoted to the second link, said lever having a series of spaced holes, and a pivotal connection at one of said holes for the last mentioned rod.

CHARLES L. HAINES.